(12) United States Patent
Hu et al.

(10) Patent No.: US 12,434,572 B2
(45) Date of Patent: Oct. 7, 2025

(54) COMPREHENSIVE CONTROL METHOD AND SYSTEM FOR DIRECT CURRENT (DC) POWER GRID OF PURE BATTERY OF SHIP

(71) Applicant: Shanghai Marine Equipment Research Institute, Shanghai (CN)

(72) Inventors: Bin Hu, Shanghai (CN); Zhilin Zeng, Shanghai (CN); Shaoyuan Wang, Shanghai (CN); Zhongling Liu, Shanghai (CN); Jian Li, Shanghai (CN)

(73) Assignee: Shanghai Marine Equipment Research Institute, Shanghai (CN)

( * ) Notice: Subject to any disclaimer, the term of this patent is extended or adjusted under 35 U.S.C. 154(b) by 0 days.

(21) Appl. No.: 19/093,363

(22) Filed: Mar. 28, 2025

(65) Prior Publication Data
US 2025/0222789 A1    Jul. 10, 2025

Related U.S. Application Data

(63) Continuation of application No. PCT/CN2024/110967, filed on Aug. 9, 2024.

(30) Foreign Application Priority Data

Oct. 20, 2023    (CN) .......................... 202311368957.7

(51) Int. Cl.
*H02P 1/00*    (2006.01)
*B60L 50/60*    (2019.01)
(Continued)

(52) U.S. Cl.
CPC ............... *B60L 50/60* (2019.02); *B60L 58/12* (2019.02); *B60L 58/21* (2019.02); *H02M 3/33573* (2021.05); *H02M 3/33584* (2013.01); *H02M 3/33592* (2013.01); *B60L 2200/32* (2013.01); *B60L 2210/10* (2013.01);
(Continued)

(58) Field of Classification Search
CPC ............. H02P 5/74; H02P 27/08; B60L 50/60
See application file for complete search history.

(56) References Cited

FOREIGN PATENT DOCUMENTS

CN    109950969 A    6/2019
CN    112039044 A    12/2020
(Continued)

*Primary Examiner* — Karen Masih
(74) *Attorney, Agent, or Firm* — Bayramoglu Law Offices LLC

(57) ABSTRACT

A comprehensive control method and system for a direct current (DC) power grid of a pure battery of a ship are provided. Four modular battery packs are configured to connect to corresponding busbars, and four propulsion inverters, an axle-hung propulsion motor, two domestic inverters, one equilibrium converter, and a comprehensive control system with a multi-strategy algorithm are configured. This scheme can flexibly schedule usage of a propulsion load and a domestic load, effectively balance states of charge (SOCs) of the battery packs, flexibly schedule charging, swapping, and usage of a containerized power supply, achieve high redundancy of a propulsion system, and effectively solve a problem of an electricity quantity balance between the battery packs. A function of an emergency rudder is implemented, which solves a problem that a steering gear cannot be used in the event of an alternating current (AC) power loss of a pure battery-powered ship.

18 Claims, 3 Drawing Sheets

(51) Int. Cl.
  *B60L 58/12* (2019.01)
  *B60L 58/21* (2019.01)
  *H02M 3/335* (2006.01)

(52) U.S. Cl.
  CPC ....... *B60L 2210/42* (2013.01); *B60L 2240/24* (2013.01); *B60L 2240/42* (2013.01)

(56) References Cited

FOREIGN PATENT DOCUMENTS

| | | | |
|---|---|---|---|
| CN | 115214387 A | | 10/2022 |
| CN | 117977521 A | | 5/2024 |
| CN | 118790453 A | * | 10/2024 |
| JP | 2007284018 A | | 11/2007 |

* cited by examiner

COMPREHENSIVE CONTROL METHOD AND SYSTEM FOR DIRECT CURRENT (DC) POWER GRID OF PURE BATTERY OF SHIP

CROSS-REFERENCE TO THE RELATED APPLICATIONS

This application is a continuation application of International Application No. PCT/CN2024/110967, filed on Aug. 9, 2024, which is based upon and claims priority to Chinese Patent Application No. 202311368957.7, filed on Oct. 20, 2023, the entire contents of which are incorporated herein by reference.

TECHNICAL FIELD

The present disclosure relates to power supply and distribution technologies for battery systems of new energy ships, and in particular, to a comprehensive control method and system for a direct current (DC) power grid of a pure battery of a ship.

BACKGROUND

A marine modular battery pack has the advantages including large capacity, mobility, high reliability, no pollution, low noise, strong adaptability, scalability, easy installation. It is now widely recognized as key equipment for implementing battery applications in electric maritime applications.

At present, the battery packs in the majority of pure-electric ships need to be connected to DC power grids of the ships through a DC-DC converter (DCDC). However, the DCDC is expensive and affects overall efficiency of the ship. For some pure battery-powered ships, their battery packs are not connected to DC power grids of the ships through the DCDC. As a result, states of charge (SOCs) of the battery packs are uneven and cannot be effectively adjusted, resulting in low redundancy in propulsion systems of the ships.

When a pure battery-powered ship experiences a power outage in an alternating current (AC) power grid, a steering gear of the ship fails and a course of the ship cannot be controlled, which may have a significant impact on safety of the ship.

SUMMARY

In response to a problem that a battery pack of an existing pure battery-powered ship needs to be connected to a DC power grid of the ship through a DCDC and a SOC of the battery pack is balanced through a control area of the DCDC, and a problem that a steering gear cannot be used in the event of an AC power loss of the pure battery-powered ship, a comprehensive control method and system for a DC power grid of a pure battery of a ship are proposed, in which four propulsion inverters, an axle-hung propulsion motor, two domestic inverters, one equilibrium converter, and a comprehensive control system with a multi-strategy algorithm are configured to effectively address a problem of an electricity quantity balance between battery packs and achieve a function of an emergency rudder.

The technical solutions of the present disclosure are as follows: A comprehensive control system for a DC power grid of a pure battery of a ship includes four identical modular battery packs, two identical propulsion systems, two domestic inverters for supplying power to a domestic load, one equilibrium converter, and one comprehensive control system, where the 1# to 4# modular battery packs are respectively connected to a first busbar to a fourth busbar, and an isolation switch and a fast-acting fuse are disposed between the modular battery pack and the corresponding busbar; 1# to 4# propulsion inverters in the propulsion systems are respectively connected to the first busbar to the fourth busbar, and the second busbar and the third busbar are connected through the equilibrium converter, and the two domestic inverters are respectively connected to the second busbar and the third busbar; each of the propulsion systems includes two propulsion inverters, two propulsion motors, and one propulsion control system, the propulsion motor is an axle-type permanent magnet synchronous motor, and the two propulsion motors are connected to a propeller after being hung on an axle; and a circuit breaker is disposed between the propulsion inverter and the propulsion motor to isolate the inverter and the propulsion motor when the propulsion system stops or malfunctions; and the comprehensive control system communicates with a 1# propulsion control system and a 2# propulsion control system through a real-time Ethernet; the comprehensive control system communicates with the 1# to 4# modular battery packs, a 1# domestic inverter, a 2# domestic inverter, and the equilibrium converter through a Profibus; the comprehensive control system controls the 1# propulsion control system to allocate power of the 1# propulsion inverter and power of the 2# propulsion inverter; the comprehensive control system controls the 2# propulsion control system to allocate power of the 3# propulsion inverter and power of the 4# propulsion inverter; the comprehensive control system controls a power output ratio of the 1# and 2# domestic inverters; and the comprehensive control system controls the equilibrium converter to perform energy transfer between the second busbar and the third busbar.

Preferably, the propulsion control system adopts a high-performance PLC as a core device for implementing control logic, a real-time Profibus is used between the propulsion control system and the propulsion inverter, and the propulsion control system sends a power giving instruction to the propulsion inverter, such that the propulsion inverter executes the power giving instruction of the propulsion control system.

Preferably, the equilibrium converter is an isolated bidirectional bridge-type DC converter, a DC at one end is converted into a high-frequency alternating current (AC) through a voltage-type inverter circuit, and then the AC is converted into a DC at the other end through a current-type inverter circuit after passing through an isolation transformer to isolate a high-frequency interference signal between a DC second busbar and third busbar; and the comprehensive control system controls the equilibrium converter to transfer energy between the DC second busbar and third busbar as needed.

A comprehensive control method for a DC power grid of a pure battery of a ship establishes the comprehensive control system for a DC power grid of a pure battery of a ship, where a propulsion control system first meets output power required for navigation of a ship, and accepts power allocated by the comprehensive control system to two propulsion inverters under the propulsion system after given power and the output power are stably maintained for 10 seconds; and when the output power for the navigation of the ship increases, preferably increasing output power of a propulsion inverter with smaller output power; or when the output power for the navigation of the ship decreases, preferably reducing output power of a propulsion inverter with larger output power.

Further, control modes are classified into an equilibrium control mode and a specific control mode;
conditions for enabling the equilibrium control mode are: $P_{12}<1.8P_N$ and $P_{34}<1.8P_N$; and conditions for enabling the specific control mode are: $P_{12}<2P_N$ and $P_{34}<2P_N$, 1# to 4# propulsion inverters have same rated power that is denoted as $P_N$, a sum of real-time power of the 1# and 2# propulsion inverters is denoted as $P_{12}$, and a sum of the rated power of the 1# and 2# propulsion inverters is denoted as $2P_N$; and a sum of real-time power of the 3# and 4# propulsion inverters is denoted as $P_{34}$, and a sum of the rated power of the 3# and 4# propulsion inverters is denoted as $2P_N$;
in the equilibrium control mode, a control objective is to keep Soc values of 1# to 4# modular battery packs consistent by scheduling power of the 1# to 4# propulsion inverters, power of 1# and 2# domestic inverters, and power of an equilibrium converter; and
in the specific control mode, a control objective is to keep a specific Soc value for one or two modular battery packs by scheduling the power of the 1# to 4# propulsion inverters, the power of the 1# and 2# domestic inverters, and the power of the equilibrium converter.

Further, the equilibrium control mode adopts an equilibrium control rule algorithm, and an average value of the battery packs is first calculated as follows:
an average Soc value $\overline{X}$ of the four battery packs is as follows:

$$\overline{X} = 0.25 * \sum_{i=1}^{4} Soc_i;$$

where $Soc_i$ represents a Soc value of an $i^{th}$ modular battery pack;
the real-time power of the 1# to 4# propulsion inverters is denoted as $P_1$, $P_2$, $P_3$, and $P_4$;
an average Soc value $\overline{X_{12}}$ of the 1# and 2# battery packs is as follows: $\overline{X_{12}}=0.5*(Soc_1+Soc_2)$;
an average Soc value $\overline{X_{34}}$ of the 3# and 4# battery packs is as follows: $\overline{X_{34}}=0.5*(Soc_3+Soc_4)$;
when Socs of the 1# and 2# battery packs are unbalanced, a power allocation control rule for the 1# and 2# propulsion inverters is as follows:
1) when $Soc_1-\overline{X_{12}}>2$ and $120\% P_N \leq P_{12}<180\% P_N$, power allocation: $P_1=90\% P_N$, and $P_2=P_{12}-90\% P_N$; or
when $Soc_1-\overline{X_{12}}<-2$ and $120\% P_N \leq P_{12}<180\% P_N$, power allocation: $P_1=P_{12}-90\% P_N$, and $P_2=90\% P_N$;
2) when $5>Soc_1-\overline{X_{12}}>2$ and $P_{12}<120\% P_N$;
power allocation: $P_1=70\% P_N$, $P_2=P_{12}-70\% P_N$, and $P_2>0$; or
when $-2<Soc_1-\overline{X_{12}}<-5$ and $P_{12}<120\% P_N$, power allocation: $P_1=P_{12}-70\% P_N$, $P_{2=70}\% P_N$, and $P_1>0$; or
3) when $Soc_1-\overline{X_{12}}>5$ and $P_{12}<120\% P_N$,
power allocation: $P_1=90\% P_N$, $P_2=P_{12}-90\% P_N$, and $P_2>0$; or
when $Soc_1-\overline{X_{12}}<-5$ and $P_{12}<120\% P_N$, power allocation: $P_1=P_{12}-90\% P_N$, $P_2=90\% P_N$, and $P_1>0$; or
when Socs of the 3# and 4# battery packs are unbalanced, for a power allocation control rule for the 3# and 4# propulsion inverters, reference is made to the power allocation control rule for the 1# and 2# propulsion inverters; and
when the average Soc value of the 1# and 2# battery packs and the average Soc value of the 3# and 4# battery packs are unbalanced, a control rule is as follows:
A: when $2<\overline{X_{12}}-\overline{X}<5$, $P_{12}<180\% P_N$, and $P_{34}<180\% P_N$, power allocation: $W_1=W_d$, $W_2=0$, and $W_3=0$;
B: when $-5<\overline{X_{12}}-\overline{X}<-2$, $P_{12}<180\% P_N$, and $P_{34}<180\% P_N$,
power allocation: $W_1=0$, $W_2=W_d$, and $W_3=0$;
C: when $\overline{X_{12}}-\overline{X}>5$, $P_{12}<180\% P_N$, and $P_{34}<180\% P_N$, power allocation: $W_1=50\% W_d$, $W_2=50\% W_d$, and $W_3=W_N$; or
when $\overline{X_{12}}-\overline{X}<-5$, $P_{12}<180\% P_N$, and $P_{34}<180\% P_N$, power allocation: $W_1=50\% W_d$, $W_2=50\% W_d$, and $W_3=-W_N$; or
D: when $P_{12}>180\% P_N$ or $P_{34}>180\% P_N$, power allocation: $W_1=50\% W_d$, $W_2=50\% W_d$, and $W_3=0$;
where real-time power of the 1# and 2# domestic inverters is $W_1$ and $W_2$, real-time power of the equilibrium converter is $W_3$, $W_d$ represents a real-time domestic load, and rated power of the equilibrium converter is $W_N$.

Further, when detecting a fault in a steering gear of a new energy ship, the propulsion control system switches to an emergency rudder mode, and the comprehensive control system implements steering control, where a 1# propulsion control system only controls the 1# propulsion inverter to output propulsion power, a 2# propulsion control system only controls the 3# propulsion inverter to output propulsion power, and the comprehensive control system estimates a navigational speed of the ship by using a formula 1 based on output power of the 1# and 3# propulsion inverters; and the comprehensive control system accepts a steering signal from the ship, calculates a difference between output power of the 2# and 4# propulsion inverters according to a formula 2, and controls the output power of the 2# propulsion inverter and the 4# propulsion inverter to achieve a power difference and realize a steering function;
a formula for the navigational speed is as follows:

$$P_1 + P_3 = k_1 V^3 + k_2 V^2 + k_3 V^1 + k_4 \qquad \text{(formula 1)}$$

where $P_1$ represents the output power of the 1# propulsion inverter, $P_3$ represents the output power of the 3# propulsion inverter, $k_1$, $k_2$, $k_3$, and $k_4$ represent coefficients, and V represents the navigational speed of the ship;
the $k_1$, $k_2$, $k_3$, and $k_4$ represent the coefficients, which are obtained through on-site testing and calculation during a navigation test; and
a formula for a rudder angle is as follows:

$$P_2 - P_4 = l_1 * \theta * V^2 \qquad \text{(formula 2)}$$

where $P_2$ represents the output power of the 2# propulsion inverter, $P_4$ represents the output power of the 4# propulsion inverter, $l_1$ represents a coefficient, $\theta$ represents the rudder angle of the ship, and V represents the navigational speed of the ship.

Further, when the propulsion control system detects a fault in the 1# propulsion inverter or a 1# propulsion motor, a 1# propulsion control system controls the 2# propulsion inverter and propulsion motor, a 2# propulsion control system controls the 4# propulsion inverter and propulsion motor, the 3# propulsion inverter stops running, and propulsion power of the entire ship is half of original power of the ship.

The present disclosure achieves the following beneficial effects: According to a comprehensive control method and system for a DC power grid of a pure battery of a ship in the present disclosure, four modular battery packs are configured to connect to corresponding busbars, and four propulsion inverters, each inverter matched with an axle-hung propulsion motor, a domestic inverter with a grid-connection function, a bidirectional controllable equilibrium converter, and a comprehensive control system with a multi-strategy algorithm are configured. This scheme can flexibly schedule usage of a propulsion load and a domestic load, effectively balance SOCs of the battery packs, flexibly schedule charging, swapping, and usage of a containerized power supply, achieve high redundancy of a propulsion system, and implement a function of an emergency rudder. An optimized energy scheduling strategy and navigation safety control strategy improve safety and reliability of the ship.

DETAILED DESCRIPTION OF THE EMBODIMENTS

The present disclosure will be described in detail below with reference to the accompanying drawings and specific embodiments. The embodiments are implemented on the premise of the technical solutions of the present disclosure. The following presents detailed implementations and specific operation processes. The protection scope of the present disclosure, however, is not limited to the following embodiments.

Figure 1:
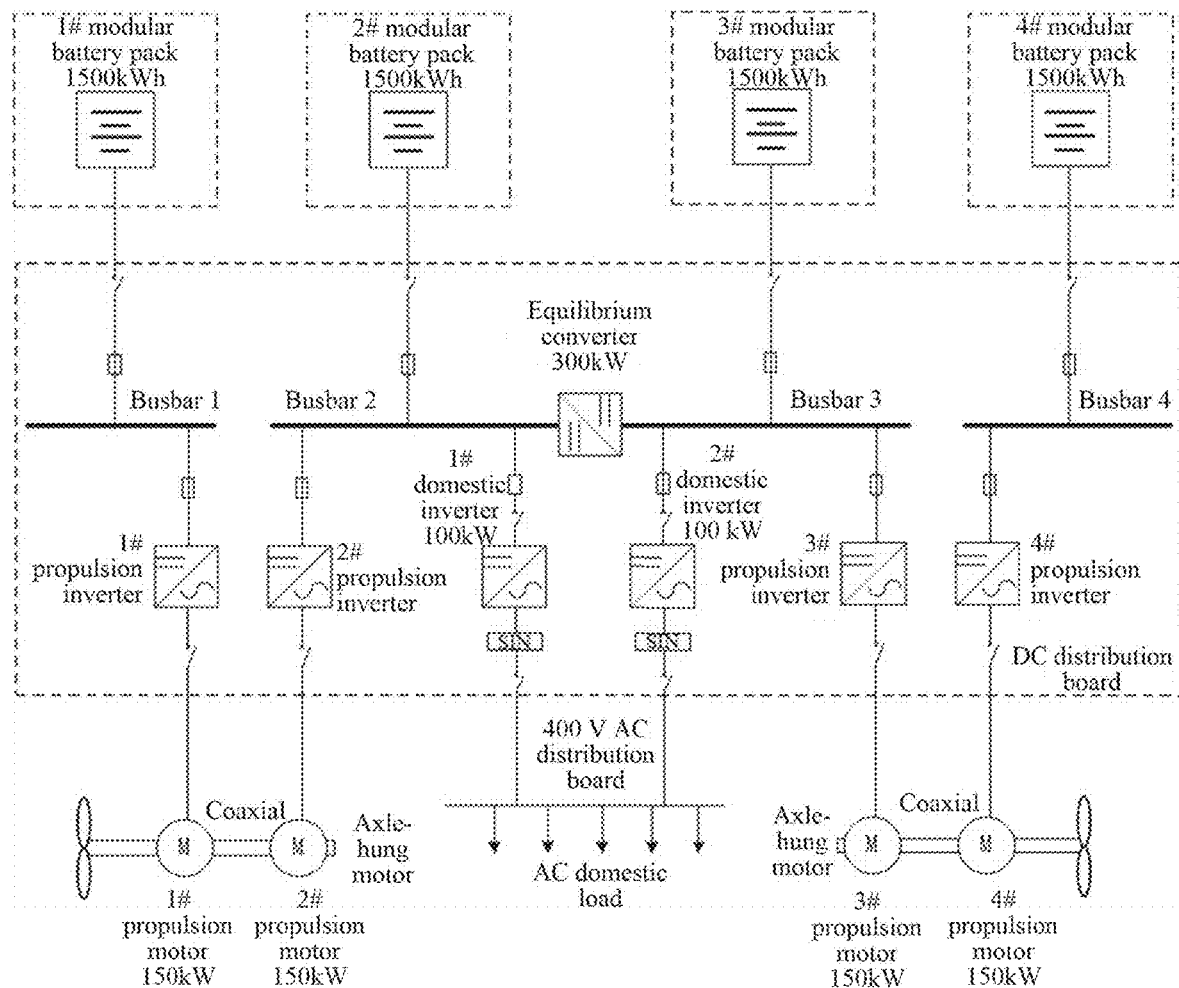
FIG. 1 is a schematic diagram of a DC power grid system of a pure battery of a ship according to the present disclosure.

FIG. 1 shows an embodiment of a DC power grid system of a pure battery of a ship according to the present disclosure. The DC power grid system of the pure battery of the ship includes four 1500 kWh modular battery packs, two 2×150 kWh propulsion systems, two 100 kW domestic inverters for supplying power to a domestic load, one 300 kW equilibrium converter, and one comprehensive control system. The 1# to 4# modular battery packs are respectively connected to busbars 1 to 4, with an isolation switch and a fast-acting fuse disposed between the modular battery back and the busbar. In the propulsion systems, 1# to 4# propulsion inverters are respectively connected to the busbars 1 to 4. The busbars 2 and 3 are connected through the equilibrium converter. The two 100 kW domestic inverters are respectively connected to the busbars 2 and 3.

Figure 2:
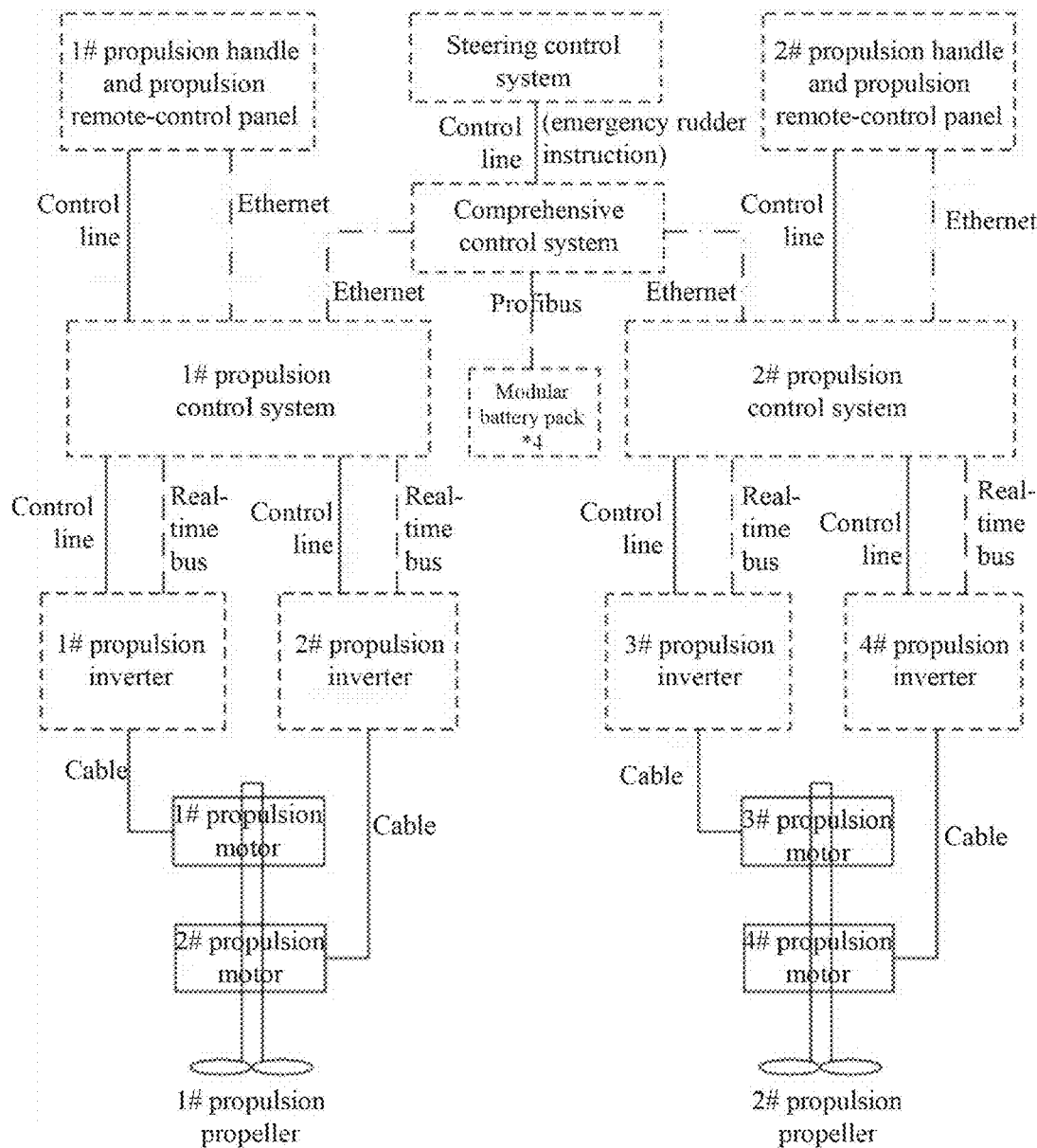
FIG. 2 schematically shows composition of a propulsion system and composition of a control system according to the present disclosure.

As shown in FIG. 2, each propulsion system includes two propulsion inverters, two propulsion motors, and one propulsion control system. The propulsion motor is a 150 kW axle-hung permanent magnet synchronous motor, and the two propulsion motors are connected to a propeller after being hung on an axle. A circuit breaker is disposed between the propulsion inverter and the propulsion motor to isolate the inverter and the propulsion motor when the propulsion system stops or malfunctions.

When the ship docks, the modular battery pack can be quickly replaced through lifting by using a quayside bridge-type crane. This solves disadvantages of a traditional large-capacity battery pack such as long charging time, an impact on ship operation, and occupation of valuable shoreline resources, and enhances competitiveness of a pure battery-powered ship.

1. Implementation of the Propulsion Control System

The propulsion control system adopts a high-performance PLC as a core device for implementing control logic, a real-time Profibus is used between the propulsion control system and the propulsion inverter, and the propulsion control system sends a power giving instruction to the propulsion inverter, such that the propulsion inverter executes the power giving instruction of the propulsion control system.

The comprehensive control system communicates with a 1# propulsion control system and a 2# propulsion control system through a real-time Ethernet. The comprehensive control system communicates with the 1# to 4# modular battery packs, a 1# domestic inverter, a 2# domestic inverter, and the equilibrium converter through a Profibus. The comprehensive control system controls the 1# propulsion control system to allocate power of the 1# propulsion inverter and power of the 2# propulsion inverter. The comprehensive control system controls the 2# propulsion control system to allocate power of the 3# propulsion inverter and power of the 4# propulsion inverter. The comprehensive control system controls a power output ratio of the 1# and 2# domestic inverters, and the comprehensive control system controls the equilibrium converter to perform energy transfer between the busbar 2 and the busbar 3.

A bridge is equipped with a propulsion control handle. A handle signal is a 4 mA to 20 mA signal, and the signal is transmitted to the PLC of the propulsion control system. The propulsion control system allocates power to two propulsion inverters based on the handle signal.

In addition, the propulsion control system accepts power allocated by the comprehensive control system. If there is no power allocation instruction from the comprehensive control system, power required for propulsion is evenly allocated to the two propulsion inverters.

The propulsion control system collects signals of the propulsion inverter: an output voltage of the inverter, an output frequency of the inverter, output power of the inverter, an output current of the inverter, an output torque of the inverter, an IGBT temperature of the inverter, a fault code of the inverter, and a status code of the inverter.

The propulsion control system collects signals of the motor: U-phase, V-phase, and W-phase winding temperatures of the motor, a drive-end bearing temperature of the motor, a non-drive-end bearing temperature of the motor, and a cooling water temperature of the motor.

Figure 3:
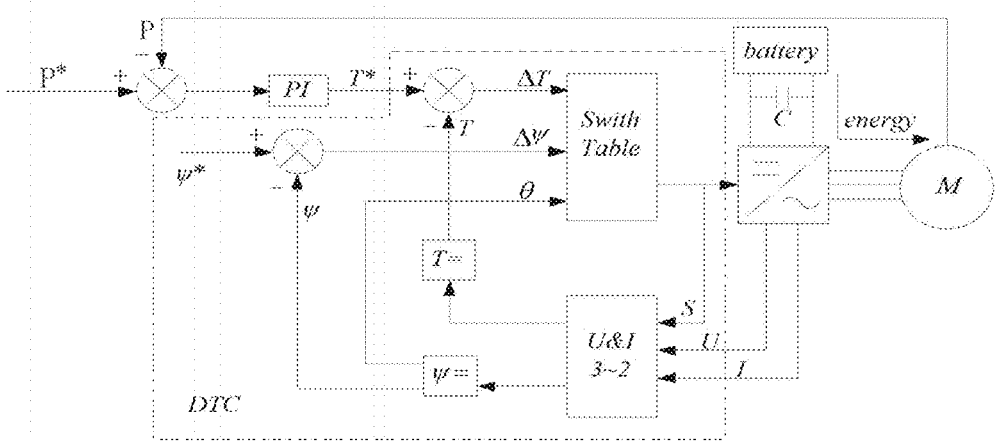
FIG. 3 is a schematic diagram of direct power control logic of a propulsion inverter according to the present disclosure.

The propulsion inverter adopts a direct power control algorithm as shown in FIG. 3. As shown in FIG. 3, when output power P of the propulsion inverter is positive, electric energy of the battery pack provides output power to the propulsion motor through the propulsion inverter. On the contrary, when the output power P is negative, mechanical energy of the motor charges the battery pack through the propulsion inverter.

The propulsion control system first meets output power required for navigation of the ship, and accepts power allocated by the comprehensive control system to two propulsion inverters under the propulsion system after given power and the output power are stably maintained for 10 seconds.

When the output power for the navigation of the ship increases, output power of a propulsion inverter with smaller output power is preferably increased. When the output power for the navigation of the ship decreases, output power of a propulsion inverter with larger output power is preferably reduced.

2. Implementation of the Equilibrium Converter

Figure 4:
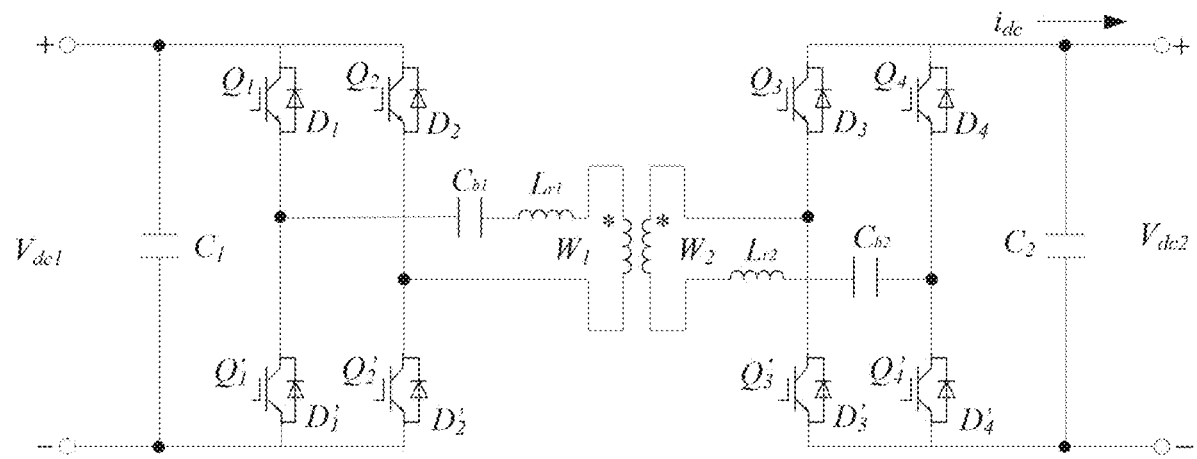
FIG. 4 is an electrical principle diagram of an equilibrium converter according to the present disclosure.

As shown in FIG. 4, the equilibrium converter is an isolated bidirectional bridge-type DC converter. DC $V_{dc1}$ at one end is connected in parallel to input-side capacitor $C_1$. Then the DC is converted into a high-frequency AC through a voltage-type inverter circuit constituted by resonant inductor $L_{r1}$, series resonant capacitor $C_{b1}$, and switching transistors $Q_1$, $Q_1'$, $Q_2$, and $Q_2'$. After passing through an isolation transformer, the AC is converted into a DC through a current-type inverter circuit constituted by resonant inductor $L_{r2}$ and switching transistors $Q_3$, $Q_3'$, $Q_4$, and $Q_4'$. The DC is connected in parallel to output-side capacitor $C_2$ to output DC $V_{dc2}$. The switching transistors $Q_1$, $Q_1'$, $Q_2$, and $Q_2'$ are correspondingly connected in parallel to freewheeling diodes $D_1$, $D_1'$, $D_2$, and $D_2'$, and the switching transistors $Q_3$, $Q_3'$, $Q_4$, and $Q_4'$ are correspondingly connected in parallel to freewheeling diodes $D_3$, $D_3'$, $D_4$, and $D_4'$. The isolated bidirectional bridge-type DC converter can effectively isolate a high-frequency interference signal between DC busbar 2 and DC busbar 3. The comprehensive control system controls the equilibrium converter to transfer energy between the DC busbar 2 and the DC busbar 3 as needed.

As shown in FIG. 4, when the $Q_1$ and the $Q_2'$ in the voltage-type inverter circuit are turned on, the $Q_3$ and the $Q_4'$ in the current-type inverter circuit are controlled to be turned on. When the $Q_2$ and the in the voltage-type inverter circuit are turned on, the $Q_4$ and the $Q_3'$ in the current-type inverter circuit are controlled to be turned on. The energy is transmitted from the $V_{dc1}$ to the $V_{dc2}$, $i_{dc}$ flows from left to right, that is, is transmitted from the DC busbar 2 to the DC busbar 3, and output power of the equilibrium converter is positive. When the $Q_1$ and the $Q_2'$ are turned on, the $i_{dc}$ increases in a positive direction. When the $Q_1$ is turned off, the $Q_2'$ and the $D_1'$ perform freewheeling. After the $D_3$, $D_4$, $D_3'$, $D_4'$ perform freewheeling, the $i_{dc}$ decreases in the positive direction. At this time, the $Q_3$, $Q_4$, $Q_3'$, $Q_4'$ are all turned on, but no current flows.

As shown in FIG. 4, when the energy is transmitted from the $V_{dc2}$ to the $V_{dc1}$, the $Q_3$, $Q_4$, $Q_3'$, $Q_4'$ are first turned on, and the ide increases in an opposite direction. When a maximum value is reached, the $Q_4$ and the $Q_3'$ are turned off. The $i_{dc}$ flows into $W_2$ through the $Q_3$ and the $Q_4'$, flows out of $W_1$ through the isolation transformer, and reaches the $V_{dc1}$ through the $D_1$ and the $D_2'$. The $i_{dc}$ flows from right to left, that is, is transmitted from the DC busbar 3 to the DC busbar 2, and the output power of the equilibrium converter is negative.

3. Specific Implementation of an Equilibrium Control Rule

In this embodiment, rated power $P_N$ of each propulsion inverter is equal to 150 kW. When Socs (a ratio of a remaining capacity to a battery capacity, which is commonly expressed as a percentage) of the 1# and 2# battery packs are unbalanced, a power allocation control rule for the 1# and 2# propulsion inverters is as follows:

1) For example, when $Soc_1$ of the 1# battery pack is equal to 85%, an average electricity quantity percentage $\overline{X_{12}}$ of the 1# and 2# battery packs is equal to 81%, and real-time total power $P_{12}$ of the 1# and 2# propulsion inverters is greater than 180 kW and less than 270 kW, power allocation: real-time power $P_1$ of the 1# propulsion inverter is equal to 135 kW, and real-time power $P_2$ of the 2# propulsion inverter is equal to $P_{12}-135$ kW.

For example, when $Soc_1=85\%$, $\overline{X_{12}}=89\%$, and 180 kW<$P_{12}$<270 kW, power allocation: $P_1=P_{12}-135$ kW, and $P_2=135$ kW.

2) For example, when $Soc_1-85\%$, $\overline{X_{12}}=81\%$, and $P_{12}<180$ kW, power allocation: $P_1=105$ kW, $P_2=P_{12}-105$ kW, and $P_2>0$.

For example, when $Soc_1-85\%$, $\overline{X_{12}}=89\%$, and $P_{12}<180$ kW, power allocation: $P_1=P_{12}-105$ kW, $P_2=105$ kW, and $P_2>0$.

3) For example, when $Soc_1=85\%$, $\overline{X_{12}}=79\%$, and $P_{12}<180$ kW, power allocation: $P_1=135$ kW, $P_2=P_{12}-135$ kW, and $P_2>0$.

For example, when $Soc_1=85\%$, $\overline{X_{12}}=91\%$, and $P_{12}<180$ kW, power allocation: $P_1=P_{12}-135$ kW, and $P_2=135$ kW.

When Socs of the 3# and 4# battery packs are unbalanced, for an allocation control rule for the power $P_3$ of the 3# propulsion inverter and the power $P_4$ of the propulsion inverter, reference is made to the power allocation control rule for the 1# and 2# propulsion inverters.

When an average Soc value of the 1# and 2# battery packs and an average Soc value of the 3# and 4# battery packs are unbalanced, a control rule is as follows:

1) For example, when $\overline{X_{12}}=85\%$, an average Soc value $\overline{X}$ of the four battery packs is equal to 81%, $P_{12}<270$ kW, and real-time total power $P_{34}$ of the 3# and 4# propulsion inverters is <270 kW, power allocation: real-time power $W_1$ of the 1# domestic inverter is equal to real-time domestic load $W_d$, real-time power $W_2$ of the 2# domestic inverter is equal to 0, and real-time power $W_3$ of the equilibrium converter is equal to 0.

2) For example, when $\overline{X_{12}}=85\%$, $\overline{X}=89\%$, $P_{12}<270$ kW, and $P_{34}<270$ kW, power allocation: $W_1=0$, $W_2=W_d$, and $W_3=0$.

3) For, when $\overline{X_{12}}=85\%$, $\overline{X}=79\%$, $P_{12}<270$ kW, and $P_{34}<270$ kW, power allocation: $W_1=W_d/2$, $W_2=W_d/2$, and $W_3=300$ kW.

When $\overline{X_{12}}=85\%$, $\overline{X}=91\%$, $P_{12}<270$ kW, and $P_{34}<270$ kW, power allocation: $W_1=W_d/2/2$, $W_2=W_d/2$, and $W_3=-300$ kW.

4. Specific Implementation of a Specific Control Rule

A control rule for specifically controlling one battery pack is as follows: A control objective is to maintain a specific SOC value for one or two modular battery packs. In order to keep a high SOC value of the modular battery pack, during battery swapping at a next dock, a modular battery pack whose SOC is not high needs to be replaced, while a modular battery pack with a high SOC does not need to be replaced.

It is specified that the 1# battery pack is the control objective, and conditions for enabling the specific control mode are met.

Power allocation: $P_1=-(150 \text{ kW}-P_{12})$, $P_2=150$ kW, $P_3=50\% P_{34}$, and $P_4=50\% P_{34}$.

A control rule for specifically controlling two battery packs is as follows:

It is specified that the 1# and 4# battery packs are the control objective, and the conditions for enabling the specific control mode are met.

Power allocation: $P_1=-(150 \text{ kW}-P_{12})$, $P_2=150$ kW, $P_3=150$ kW, and $P_4-(150 \text{ kW}-P_{34})$.

Figure 5:
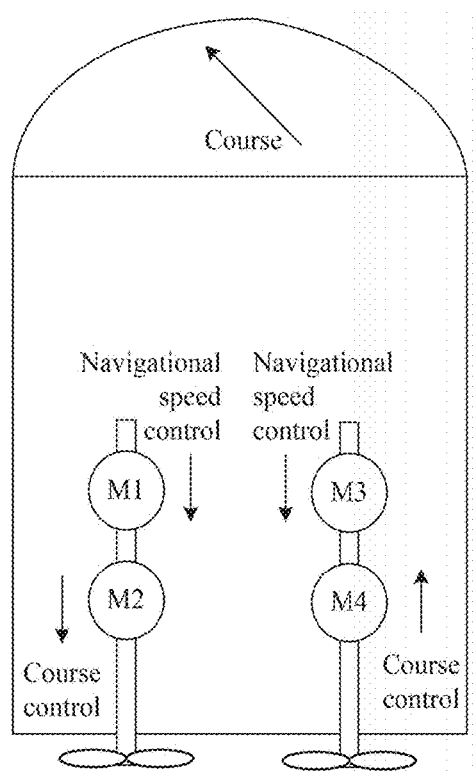
FIG. 5 is a schematic diagram of controlling an emergency rudder according to the present disclosure.

5. Specific Implementation of an Emergency Rudder Mode:

When a steering gear of a new energy ship fails, the steering gear switches to the emergency rudder mode, as shown in FIG. 5. Output power of a 1# propulsion motor and a 3# propulsion motor controls a navigational speed of the ship, while output power of a 2# propulsion motor and a 4# propulsion motor controls a course of the ship. As shown in FIG. 5, when the output power of the 2# propulsion motor is positive and the output power of the 4# propulsion motor is negative, the ship navigates leftwards, and vice versa, the ship navigates rightwards. Power of the 1# to 4# propulsion motors is provided by the corresponding propulsion inverters.

The 1# propulsion control system only controls the 1# propulsion inverter to output propulsion power, while the 2# propulsion control system only controls the 3# propulsion inverter to output propulsion power.

The comprehensive control system estimates the navigational speed of the ship by using formula 1 based on the output power of the 1# and 3# propulsion inverters.

A formula for the navigational speed is as follows:
$P_1+P_3=k_1V^3+k_2V^2+k_3V^1+k_4$ (formula 1)

where $P_1$ represents the output power of the 1# propulsion inverter, $P_3$ represents the output power of the 3# propulsion inverter, $k_1$, $k_2$, $k_3$, and $k_4$ represent coefficients, and V represents the navigational speed of the ship.

The $k_1$, $k_2$, $k_3$, and $k_4$ represent the coefficients, which are obtained through on-site testing and calculation during a navigation test.

As shown in FIG. 2, the comprehensive control system receives a signal from a steering control system of the ship and calculates a difference between the output power of the 2# and 4# propulsion inverters according to formula 2. The comprehensive control system controls the output power of the 2# propulsion inverter and the 4# propulsion inverter to achieve a power difference and realize a steering function.

A formula for a rudder angle is as follows:
$P_2-P_4=l_1*\theta*V^2$ (formula 2)

where $P_2$ represents the output power of the 2# propulsion inverter, $P_4$ represents the output power of the 4# propulsion inverter, $l_1$ represents a coefficient, $\theta$ represents the rudder angle of the ship, and V represents the navigational speed of the ship.

The $l_1$ represents the coefficient, which is obtained through the on-site testing and calculation during the navigation test.

6. Specific Implementation of a Propulsion Emergency Mode

When any one propulsion inverter or propulsion motor fails, for example, when the 1# propulsion inverter or the 1# propulsion motor fails, the 1# propulsion control system controls the 2# propulsion inverter and the 2# propulsion motor, the 2# propulsion control system controls the 4# propulsion inverter and the 4# propulsion motor, the 3# propulsion inverter stops running, and propulsion power of the entire ship is half of original power of the ship.

The above embodiments are merely several implementations of the present disclosure. Although these embodiments are described specifically and in detail, they should not be construed as a limitation to the patent scope of the present disclosure. It should be noted that those of ordinary skill in the art can further make several variations and improvements without departing from the concept of the present disclosure, and all of these fall within the protection scope of the present disclosure. Therefore, the protection scope of the present disclosure shall be subject to the protection scope defined by the claims.

What is claimed is:

1. A comprehensive control system for a direct current (DC) power grid of a pure battery of a ship, comprising 1# to 4# four identical modular battery packs, two identical propulsion systems, two domestic inverters for supplying power to a domestic load, one equilibrium converter, and one comprehensive control system, wherein the 1# to 4# modular battery packs are identical, the 1# to 4# modular battery packs are respectively connected to a first busbar to a fourth busbar, and an isolation switch and a fast-acting fuse are disposed between the modular battery pack and the corresponding busbar, 1# to 4# propulsion inverters in the two identical propulsion systems are respectively connected to the first busbar to the fourth busbar, and the second busbar and the third busbar are connected through the equilibrium converter, and the two domestic inverters are respectively connected to the second busbar and the third busbar; each of the two identical propulsion systems comprises two propulsion inverters, two propulsion motors, and one propulsion control system, the propulsion motor is an axle-type permanent magnet synchronous motor, and the two propulsion motors are connected to a propeller after being hung on an axle; and a circuit breaker is disposed between the propulsion inverter and the propulsion motor to isolate the inverter and the propulsion motor when the two identical propulsion systems stop or malfunction; and the comprehensive control system communicates with a 1# propulsion control system and a 2# propulsion control system through a real-time Ethernet; the comprehensive control system communicates with the 1# to 4# modular battery packs, a 1# domestic inverter, a 2# domestic inverter, and the equilibrium converter through a Profibus; the comprehensive control system controls the 1# propulsion control system to allocate power of the 1# propulsion inverter and power of the 2# propulsion inverter; the comprehensive control system controls the 2# propulsion control system to allocate power of the 3# propulsion inverter and power of the 4# propulsion inverter; the comprehensive control system controls a power output ratio of the 1# and 2# domestic inverters; and the comprehensive control system controls the equilibrium converter to perform energy transfer between the second busbar and the third busbar.

2. The comprehensive control system for the DC power grid of the pure battery of the ship according to claim 1, wherein the propulsion control system adopts a high-performance programmable logic controller (PLC) as a core device for implementing control logic, a real-time Profibus is configured between the propulsion control system and the propulsion inverter, and the propulsion control system sends a power giving instruction to the propulsion inverter, wherein the propulsion inverter executes the power giving instruction of the propulsion control system.

3. The comprehensive control system for the DC power grid of the pure battery of the ship according to claim 1, wherein the equilibrium converter is an isolated bidirectional bridge-type DC converter, a DC at a first end is converted into a high-frequency alternating current (AC) through a voltage-type inverter circuit, and the AC is converted into a DC at a second end through a current-type inverter circuit after passing through an isolation transformer to isolate a high-frequency interference signal between a DC second busbar and third busbar; and the comprehensive control system controls the equilibrium converter to transfer energy between the DC second busbar and third busbar as needed.

4. A comprehensive control method for a DC power grid of a pure battery of a ship, comprising: establishing the comprehensive control system for the DC power grid of the pure battery of the ship according to claim 1, wherein the propulsion control system meets output power required for navigation of the ship, and accepts the power allocated by the comprehensive control system to the two propulsion inverters under the propulsion system after given power and the output power are stably maintained for 10 seconds; and
when the output power for the navigation of the ship increases, increasing output power of the propulsion inverter with smaller output power; or
when the output power for the navigation of the ship decreases, reducing output power of the propulsion inverter with larger output power.

5. The comprehensive control method for the DC power grid of the pure battery of the ship according to claim 4, wherein control modes are classified into an equilibrium control mode and a specific control mode;
conditions for enabling the equilibrium control mode are: $P_{12}<1.8P_N$ and $P_{34}<1.8P_N$; and conditions for enabling the specific control mode are: $P_{12}<2P_N$ and $P_{34}<2P_N$;
the 1# to 4# propulsion inverters have same rated power, wherein the rated power is denoted as $P_N$, a sum of real-time power of the 1# and 2# propulsion inverters is denoted as $P_{12}$, and a sum of the rated power of the 1# and 2# propulsion inverters is denoted as $2P_N$; and a sum of real-time power of the 3# and 4# propulsion inverters is denoted as $P_{34}$, and a sum of the rated power of the 3# and 4# propulsion inverters is denoted as $2P_N$;
in the equilibrium control mode, a control objective is to keep state of charge (SOC) values of the 1# to 4# modular battery packs consistent by scheduling the power of the 1# to 4# propulsion inverters, the power of the 1# and 2# domestic inverters, and power of the equilibrium converter; and
in the specific control mode, a control objective is to keep a specific Soc value for one or two modular battery packs by scheduling the power of the 1# to 4# propulsion inverters, the power of the 1# and 2# domestic inverters, and the power of the equilibrium converter.

6. The comprehensive control method for the DC power grid of the pure battery of the ship according to claim 5, wherein the equilibrium control mode adopts an equilibrium control rule algorithm, and an average value of the four modular battery packs is calculated as follows:
an average Soc value $\overline{X}$ of the four battery packs is as follows:

$$\overline{X} = 0.25 * \sum_{i=1}^{4} Soc_i;$$

wherein $Soc_i$ represents a Soc value of an $i^{th}$ modular battery pack;
the real-time power of the 1# to 4# propulsion inverters is denoted as $P_1$, $P_2$, $P_3$, and $P_4$;
an average Soc value $\overline{X_{12}}$ of the 1# and 2# modular battery packs is as follows: $\overline{X_{12}}=0.5*(Soc_1+Soc_2)$;
an average Soc value $\overline{X_{34}}$ of the 3# and 4# modular battery packs is as follows: $\overline{X_{34}}=0.5*(Soc_3+Soc_4)$;
when Socs of the 1# and 2# modular battery packs are unbalanced, a power allocation control rule for the 1# and 2# propulsion inverters is as follows:
1) when $Soc_1-\overline{X_{12}}>2$ and $120\% P_N \leq P_{12}<180\% P_N$, power allocation: $P_1=90\% P_N$, and $P_2=P_{12}-90\% P_N$; or
when $Soc_1-\overline{X_{12}}<-2$ and $120\% P_N \leq P_{12}<180\% P_N$, power allocation: $P_1=P_{12}-90\% P_N$, and $P_2=90\% P_N$;
2) when $5>Soc_1-\overline{X_{12}}>2$ and $P_{12}<120\% P_N$;
power allocation: $P_1=70\% P_N$, $P_2=P_{12}-70\% P_N$, and $P_2>0$; or
when $-2<Soc_1-\overline{X_{12}}<-5$ and $P_{12}<120\% P_N$,
power allocation: $P_1=P_{12}-70\% P_N$, $P_2=70\% P_N$, and $P_1>0$; or
3) when $Soc_1-\overline{X_{12}}>5$ and $P_{12}<120\% P_N$,
power allocation: $P_1=90\% P_N$, $P_2=P_{12}-90\% P_N$, and $P_2>0$; or
when $Soc_1-\overline{X_{12}}<-5$ and $P_{12}<120\% P_N$,
power allocation: $P_1=P_{12}-90\% P_N$, $P_2=90\% P_N$, and $P_1>0$;
when Socs of the 3# and 4# modular battery packs are unbalanced, for a power allocation control rule for the 3# and 4# propulsion inverters, reference is made to the power allocation control rule for the 1# and 2# propulsion inverters; and
when the average Soc value of the 1# and 2# modular battery packs and the average Soc value of the 3# and 4# modular battery packs are unbalanced, a control rule is as follows:
A: when $2<\overline{X_{12}}-\overline{X}<5$, $P_{12}<180\% P_N$, and $P_{34}<180\% P_N$, power allocation: $W_1=W_d$, $W_2=0$, and $W_3=0$;
B: when $-5<\overline{X_{12}}-\overline{X}<-2$, $P_{12}<180\% P_N$, and $P_{34}<180\% P_N$,
power allocation: $W_1=0$, $W_2=W_d$, and $W_3=0$;
C: when $\overline{X_{12}}-\overline{X}>5$, $P_{12}<180\% P_N$, and $P_{34}<180\% P_N$,
power allocation: $W_1=50\% W_d$, $W_2=50\% W_d$, and $W_3=W_N$; or
when $\overline{X_{12}}-\overline{X}<-5$, $P_{12}<180\% P_N$, and $P_{34}<180\% P_N$,
power allocation: $W_1=50\% W_d$, $W_2=50\% W_d$, and $W_3=-W_N$; or
D: when $P_{12}>180\% P_N$ or $P_{34}>180\% P_N$,
power allocation: $W_1=50\% W_d$, $W_2=50\% W_d$, and $W_3=0$;
wherein real-time power of the 1# and 2# domestic inverters is $W_1$ and $W_2$, real-time power of the equilibrium converter is $W_3$, $W_d$ represents a real-time domestic load, and rated power of the equilibrium converter is $W_N$.

7. The comprehensive control method for the DC power grid of the pure battery of the ship according to claim 5, wherein when detecting a fault in a steering gear of a new energy ship, the propulsion control system switches to an emergency rudder mode, and the comprehensive control system implements steering control, wherein the 1# propulsion control system only controls the 1# propulsion inverter to output propulsion power, the 2# propulsion control system only controls the 3# propulsion inverter to output propulsion power, and the comprehensive control system estimates a navigational speed of the ship by using a formula 1 based on output power of the 1# and 3# propulsion inverters; and the comprehensive control system accepts a steering signal from the ship, calculates a difference between output power of the 2# and 4# propulsion inverters according to a formula 2, and controls the output power of the 2# propulsion inverter and the 4# propulsion inverter to achieve a power difference and realize a steering function;

a formula for the navigational speed is as follows:
$P_1+P_3=k_1V^3+k_2V^2+k_3V^1+k_4$ (formula 1)
wherein $P_1$ represents the output power of the 1# propulsion inverter, $P_3$ represents the output power of the 3# propulsion inverter, $k_1$, $k_2$, $k_3$, and $k_4$ represent coefficients, and V represents the navigational speed of the ship;

the $k_1$, $k_2$, $k_3$, and $k_4$ represent the coefficients, wherein the coefficients are obtained through on-site testing and calculation during a navigation test; and a formula for a rudder angle is as follows: $P_2-P_4=l_1*\theta*V^2$ (formula 2)
wherein $P_2$ represents the output power of the 2# propulsion inverter, $P_4$ represents the output power of the 4# propulsion inverter, $l_1$ represents a coefficient, $\theta$ represents the rudder angle of the ship, and V represents the navigational speed of the ship.

8. The comprehensive control method for the DC power grid of the pure battery of the ship according to claim 5, wherein when the propulsion control system detects a fault in the 1# propulsion inverter or a 1# propulsion motor, the 1# propulsion control system controls the 2# propulsion inverter and a 2# propulsion motor, the 2# propulsion control system controls the 4# propulsion inverter and a 4# propulsion motor, the 3# propulsion inverter stops running, and propulsion power of the ship is half of original power of the ship.

9. The comprehensive control method according to claim 4, wherein in the comprehensive control system, the propulsion control system adopts a high-performance programmable logic controller (PLC) as a core device for implementing control logic, a real-time Profibus is configured between the propulsion control system and the propulsion inverter, and the propulsion control system sends a power giving instruction to the propulsion inverter, wherein the propulsion inverter executes the power giving instruction of the propulsion control system.

10. The comprehensive control method according to claim 4, wherein in the comprehensive control system, the equilibrium converter is an isolated bidirectional bridge-type DC converter, a DC at a first end is converted into a high-frequency alternating current (AC) through a voltage-type inverter circuit, and the AC is converted into a DC at a second end through a current-type inverter circuit after passing through an isolation transformer to isolate a high-frequency interference signal between a DC second busbar and third busbar; and the comprehensive control system controls the equilibrium converter to transfer energy between the DC second busbar and third busbar as needed.

11. The comprehensive control method for the DC power grid of the pure battery of the ship according to claim 9, wherein control modes are classified into an equilibrium control mode and a specific control mode;
conditions for enabling the equilibrium control mode are: $P_{12}<1.8P_N$ and $P_{34}<1.8P_N$, and conditions for enabling the specific control mode are: $P_{12}<2P_N$ and $P_{34}<2P_N$;
the 1# to 4# propulsion inverters have same rated power, wherein the rated power is denoted as $P_N$, a sum of real-time power of the 1# and 2# propulsion inverters is denoted as $P_{12}$, and a sum of the rated power of the 1# and 2# propulsion inverters is denoted as $2P_N$; and a sum of real-time power of the 3# and 4# propulsion inverters is denoted as $P_{34}$, and a sum of the rated power of the 3# and 4# propulsion inverters is denoted as $2P_N$;
in the equilibrium control mode, a control objective is to keep state of charge (SOC) values of the 1# to 4# modular battery packs consistent by scheduling the power of the 1# to 4# propulsion inverters, the power of the 1# and 2# domestic inverters, and power of the equilibrium converter; and
in the specific control mode, a control objective is to keep a specific Soc value for one or two modular battery packs by scheduling the power of the 1# to 4# propulsion inverters, the power of the 1# and 2# domestic inverters, and the power of the equilibrium converter.

12. The comprehensive control method for the DC power grid of the pure battery of the ship according to claim 10, wherein control modes are classified into an equilibrium control mode and a specific control mode;
conditions for enabling the equilibrium control mode are: $P_{12}<1.8P_N$ and $P_{34}<1.8P_N$; and conditions for enabling the specific control mode are: $P_{12}<2P_N$ and $P_{34}<2P_N$;
the 1# to 4# propulsion inverters have same rated power, wherein the rated power is denoted as $P_N$, a sum of real-time power of the 1# and 2# propulsion inverters is denoted as $P_{12}$, and a sum of the rated power of the 1# and 2# propulsion inverters is denoted as $2P_N$; and a sum of real-time power of the 3# and 4# propulsion inverters is denoted as $P_{34}$, and a sum of the rated power of the 3# and 4# propulsion inverters is denoted as $2P_N$;
in the equilibrium control mode, a control objective is to keep state of charge (SOC) values of the 1# to 4# modular battery packs consistent by scheduling the power of the 1# to 4# propulsion inverters, the power of the 1# and 2# domestic inverters, and power of the equilibrium converter; and
in the specific control mode, a control objective is to keep a specific Soc value for one or two modular battery packs by scheduling the power of the 1# to 4# propulsion inverters, the power of the 1# and 2# domestic inverters, and the power of the equilibrium converter.

13. The comprehensive control method for the DC power grid of the pure battery of the ship according to claim 11, wherein the equilibrium control mode adopts an equilibrium control rule algorithm, and an average value of the four modular battery packs is calculated as follows:
an average Soc value $\overline{X}$ of the four battery packs is as follows:

$$\overline{X} = 0.25 * \sum_{i=1}^{4} Soc_i;$$

wherein $Soc_i$ represents a Soc value of an $i^{th}$ modular battery pack;
the real-time power of the 1# to 4# propulsion inverters is denoted as $P_1$, $P_2$, $P_3$, and $P_4$;
an average Soc value $\overline{X_{12}}$ of the 1# and 2# modular battery packs is as follows: $\overline{X_{12}}=0.5*(Soc_1+Soc_2)$;
an average Soc value $\overline{X_{34}}$ of the 3# and 4# modular battery packs is as follows: $\overline{X_{34}}=0.5*(Soc_3+Soc_4)$;
when Socs of the 1# and 2# modular battery packs are unbalanced, a power allocation control rule for the 1# and 2# propulsion inverters is as follows:
1) when $Soc_1-\overline{X_{12}}>2$ and $120\% P_N \leq P_{12}<180\% P_N$, power allocation: $P_1=90\% P_N$, and $P_2=P_{12}-90\% P_N$; or when $Soc_1-\overline{X_{12}}<-2$ and $120\% P_N \leq P_{12}<180\% P_N$, power allocation: $P_1=P_{12}-90\% P_N$, and $P_2=90\% P_N$;
2) when $5>Soc_1-\overline{X_{12}}>2$ and $P_{12}<120\% P_N$;
power allocation: $P_1=70\% P_N$, $P_2=P_{12}-70\% P_N$, and $P_2>0$; or when $-2<\text{Soc}_1-\overline{X_{12}}<-5$ and $P_{12}<120\%\ P_N$,
power allocation: $P_1=P_{12}-70\%\ P_N$, $P_2=70\%\ P_N$, and $P_1>0$; or
3) when $\text{Soc}_1-\overline{X_{12}}>5$ and $P_{12}<120\%\ P_N$,
power allocation: $P_1=90\%\ P_N$, $P_2=P_{12}-90\%\ P_N$, and $P_2>0$; or
when $\text{Soc}_1-\overline{X_{12}}<-5$ and $P_{12}<120\%\ P_N$,
power allocation: $P_1=P_{12}-90\%\ P_N$, $P_2=90\%\ P_N$, and $P_1>0$;
when Socs of the 3# and 4# modular battery packs are unbalanced, for a power allocation control rule for the 3# and 4# propulsion inverters, reference is made to the power allocation control rule for the 1# and 2# propulsion inverters; and
when the average Soc value of the 1# and 2# modular battery packs and the average Soc value of the 3# and 4# modular battery packs are unbalanced, a control rule is as follows:
A: when $2<\overline{X_{12}}-\overline{X}<5$, $P_{12}<180\%\ P_N$, and $P_{34}<180\%\ P_N$,
power allocation: $W_1=W_d$, $W_2=0$, and $W_3=0$;
B: when $-5<\overline{X_{12}}-\overline{X}<-2$, $P_{12}<180\%\ P_N$, and $P_{34}<180\%\ P_N$,
power allocation: $W_1=0$, $W_2=W_d$, and $W_3=0$;
C: when $\overline{X_{12}}-\overline{X}>5$, $P_{12}<180\%\ P_N$, and $P_{34}<180\%\ P_N$,
power allocation: $W_1=50\%\ W_d$, $W_2=50\%\ W_d$, and $W_3=W_N$, or
when $\overline{X_{12}}-\overline{X}<-5$, $P_{12}<180\%\ P_N$, and $P_{34}<180\%\ P_N$,
power allocation: $W_1=50\%\ W_d$, $W_2=50\%\ W_d$, and $W_3==W_N$; or
D: when $P_{12}>180\%\ P_N$ or $P_{34}>180\%\ P_N$,
power allocation: $W_1=50\%\ W_d$, $W_2=50\%\ W_d$, and $W_3=0$;
wherein real-time power of the 1# and 2# domestic inverters is $W_1$ and $W_2$, real-time power of the equilibrium converter is $W_3$, $W_d$ represents a real-time domestic load, and rated power of the equilibrium converter is $W_N$.

14. The comprehensive control method for the DC power grid of the pure battery of the hip according to claim 12, wherein the equilibrium control mode adopts an equilibrium control rule algorithm, and an average value of the four modular battery packs is calculated as follows:
an average Soc value $\overline{X}$ of the four battery packs is as follows:

$$\overline{X}=0.25*\sum_{i=1}^{4}\text{Soc}_i;$$

wherein $\text{Soc}_i$ represents a Soc value of an $i^{th}$ modular battery pack;
the real-time power of the 1# to 4# propulsion inverters is denoted as $P_1$, $P_2$, $P_3$, and $P_4$;
an average Soc value $\overline{X_{12}}$ of the 1# and 2# modular battery packs is as follows: $\overline{X_{12}}=0.5*(\text{Soc}_1+\text{Soc}_2)$;
an average Soc value $\overline{X_{34}}$ of the 3# and 4# modular battery packs is as follows: $\overline{X_{34}}=0.5*(\text{Soc}_3+\text{Soc}_4)$;
when Socs of the 1# and 2# modular battery packs are unbalanced, a power allocation control rule for the 1# and 2# propulsion inverters is as follows:
1) when $\text{Soc}_1-\overline{X_{12}}>2$ and $120\%\ P_N\leq P_{12}<180\%\ P_N$,
power allocation: $P_1=90\%\ P_N$, and $P_2=P_{12}-90\%\ P_N$; or
when $\text{Soc}_1-\overline{X_{12}}<-2$ and $120\%\ P_N\leq P_{12}<180\%\ P_N$,
power allocation: $P_1=P_{12}-90\%\ P_N$, and $P_2=90\%\ P_N$;
2) when $5>\text{Soc}_1-\overline{X_{12}}>2$ and $P_{12}<120\%\ P_N$;
power allocation: $P_1=70\%\ P_N$, $P_2=P_{12}-70\%\ P_N$, and $P_2>0$; or when $-2<\text{Soc}_1-\overline{X_{12}}<-5$ and $P_{12}<120\%\ P_N$,
power allocation: $P_1=P_{12}-70\%\ P_N$, $P_2=70\%\ P_N$, and $P_1>0$; or
3) when $\text{Soc}_1-\overline{X_{12}}>5$ and $P_{12}<120\%\ P_N$,
power allocation: $P_1=90\%\ P_N$, $P_2=P_{12}-90\%\ P_N$, and $P_2>0$; or
when $\text{Soc}_1-\overline{X_{12}}<-5$ and $P_{12}<120\%\ P_N$,
power allocation: $P_1=P_{12}-90\%\ P_N$, $P_2=90\%\ P_N$, and $P_1>0$;
when Socs of the 3# and 4# modular battery packs are unbalanced, for a power allocation control rule for the 3# and 4# propulsion inverters, reference is made to the power allocation control rule for the 1# and 2# propulsion inverters; and
when the average Soc value of the 1# and 2# modular battery packs and the average Soc value of the 3# and 4# modular battery packs are unbalanced, a control rule is as follows:
A: when $2<\overline{X_{12}}-\overline{X}<5$, $P_{12}<180\%\ P_N$, and $P_{34}<180\%\ P_N$,
power allocation: $W_1=W_d$, $W_2=0$, and $W_3=0$;
B: when $-5<\overline{X_{12}}-\overline{X}<-2$, $P_{12}<180\%\ P_N$, and $P_{34}<180\%\ P_N$,
power allocation: $W_1=0$, $W_2=W_d$, and $W_3=0$;
C: when $\overline{X_{12}}-\overline{X}>5$, $P_{12}<180\%\ P_N$, and $P_{34}<180\%\ P_N$,
power allocation: $W_1=50\%\ W_d$, $W_2=50\%\ W_d$, and $W_3=W_N$, or
when $\overline{X_{12}}-\overline{X}<-5$, $P_{12}<180\%\ P_N$, and $P_{34}<180\%\ P_N$,
power allocation: $W_1=50\%\ W_d$, $W_2=50\%\ W_d$, and $W_3=-W_N$; or
D: when $P_{12}>180\%\ P_N$ or $P_{34}>180\%\ P_N$,
power allocation: $W_1=50\%\ W_d$, $W_2=50\%\ W_d$, and $W_3=0$;
wherein real-time power of the 1# and 2# domestic inverters is $W_1$ and $W_2$, real-time power of the equilibrium converter is $W_3$, $W_d$ represents a real-time domestic load, and rated power of the equilibrium converter is $W_N$.

15. The comprehensive control method for the DC power grid of the pure battery of the ship according to claim 11, wherein when detecting a fault in a steering gear of a new energy ship, the propulsion control system switches to an emergency rudder mode, and the comprehensive control system implements steering control, wherein the 1# propulsion control system only controls the 1# propulsion inverter to output propulsion power, the 2# propulsion control system only controls the 3# propulsion inverter to output propulsion power, and the comprehensive control system estimates a navigational speed of the ship by using a formula 1 based on output power of the 1# and 3# propulsion inverters; and the comprehensive control system accepts a steering signal from the ship, calculates a difference between output power of the 2# and 4# propulsion inverters according to a formula 2, and controls the output power of the 2# propulsion inverter and the 4# propulsion inverter to achieve a power difference and realize a steering function;
a formula for the navigational speed is as follows:

$$P_1+P_3=k_1V^3+k_2V^2+k_3V^1+k_4\ \text{(formula 1)}$$

wherein $P_1$ represents the output power of the 1# propulsion inverter, $P_3$ represents the output power of the 3# propulsion inverter, $k_1$, $k_2$, $k_3$, and $k_4$ represent coefficients, and V represents the navigational speed of the ship;
the $k_1$, $k_2$, $k_3$, and $k_4$ represent the coefficients, wherein the coefficients are obtained through on-site testing and calculation during a navigation test; and
a formula for a rudder angle is as follows:

$$P_2-P_4=l_1*\theta*V^2\ \text{(formula 2)}$$

wherein $P_2$ represents the output power of the 2# propulsion inverter, $P_4$ represents the output power of the 4# propulsion inverter, $l_1$ represents a coefficient, $\theta$ represents the rudder angle of the ship, and V represents the navigational speed of the ship.

16. The comprehensive control method for the DC power grid of the pure battery of the ship according to claim 12, wherein when detecting a fault in a steering gear of a new energy ship, the propulsion control system switches to an emergency rudder mode, and the comprehensive control system implements steering control, wherein the 1# propulsion control system only controls the 1# propulsion inverter to output propulsion power, the 2# propulsion control system only controls the 3# propulsion inverter to output propulsion power, and the comprehensive control system estimates a navigational speed of the ship by using a formula 1 based on output power of the 1# and 3# propulsion inverters; and the comprehensive control system accepts a steering signal from the ship, calculates a difference between output power of the 2# and 4# propulsion inverters according to a formula 2, and controls the output power of the 2# propulsion inverter and the 4# propulsion inverter to achieve a power difference and realize a steering function;

a formula for the navigational speed is as follows:

$$P_1 + P_3 = k_1 V^3 + k_2 V^2 + k_3 V^1 + k_4 \qquad \text{(formula}$$

wherein $P_1$ represents the output power of the 1# propulsion inverter, $P_3$ represents the output power of the 3# propulsion inverter, $k_1$, $k_2$, $k_3$, and $k_4$ represent coefficients, and V represents the navigational speed of the ship;

the $k_1$, $k_2$, $k_3$, and $k_4$ represent the coefficients, wherein the coefficients are obtained through on-site testing and calculation during a navigation test; and a formula for a rudder angle is as follows:

$$P_2 - P_4 = l_1 * \theta * V^2 \qquad \text{(formula 2)}$$

wherein $P_2$ represents the output power of the 2# propulsion inverter, $P_4$ represents the output power of the 4# propulsion inverter, $l_1$ represents a coefficient, $\theta$ represents the rudder angle of the ship, and V represents the navigational speed of the ship.

17. The comprehensive control method for the DC power grid of the pure battery of the ship according to claim 11, wherein when the propulsion control system detects a fault in the 1# propulsion inverter or a 1# propulsion motor, the 1# propulsion control system controls the 2# propulsion inverter and a 2# propulsion motor, the 2# propulsion control system controls the 4# propulsion inverter and a 4# propulsion motor, the 3# propulsion inverter stops running, and propulsion power of the ship is half of original power of the ship.

18. The comprehensive control method for the DC power grid of the pure battery of the ship according to claim 12, wherein when the propulsion control system detects a fault in the 1# propulsion inverter or a 1# propulsion motor, the 1# propulsion control system controls the 2# propulsion inverter and a 2# propulsion motor, the 2# propulsion control system controls the 4# propulsion inverter and a 4# propulsion motor, the 3# propulsion inverter stops running, and propulsion power of the ship is half of original power of the ship.

* * * * *